(12) United States Patent
Wilhelm et al.

(10) Patent No.: US 11,100,323 B2
(45) Date of Patent: Aug. 24, 2021

(54) DETECTION OF A POSE OF AN EYE (71) Applicant: Smart Eye AB, Gothenburg (SE)

(72) Inventors: Torsten Wilhelm, Gothenburg (SE); Emanuel Hasselberg, Lund (SE)

(73) Assignee: SMART EYE AB, Gothenburg (SE)

(*) Notice: Subject to any disclaimer, the term of this patent is extended or adjusted under 35 U.S.C. 154(b) by 0 days.

(21) Appl. No.: 16/758,252

(22) PCT Filed: Nov. 16, 2018

(86) PCT No.: PCT/EP2018/081557
§ 371 (c)(1),
(2) Date: Apr. 22, 2020

(87) PCT Pub. No.: WO2019/096992
PCT Pub. Date: May 23, 2019

(65) Prior Publication Data
US 2020/0342201 A1 Oct. 29, 2020

(30) Foreign Application Priority Data

Nov. 16, 2017 (EP) .................... 17202115

(51) Int. Cl.
*G06K 9/00* (2006.01)
*G06K 9/20* (2006.01)
*G06T 17/00* (2006.01)

(52) U.S. Cl.
CPC ....... *G06K 9/0061* (2013.01); *G06K 9/00604* (2013.01); *G06K 9/2027* (2013.01); *G06T 17/00* (2013.01)

(58) Field of Classification Search
CPC .......... G06K 9/0061; G06K 9/00604; G06K 9/2027; G06K 9/00597; G06T 17/00
See application file for complete search history.

(56) References Cited

U.S. PATENT DOCUMENTS 8,077,914 B1* 12/2011 Kaplan .............. G06F 3/013
382/103
8,824,779 B1* 9/2014 Smyth ............... G06T 7/593
382/154

(Continued)

FOREIGN PATENT DOCUMENTS

EP         2052676 A1    4/2009
WO    WO-2016142489 A1 * 9/2016 ........ G06K 9/00597

OTHER PUBLICATIONS

Sun, "Real time gaze estimation with a consumer depth camera", Information Sciences 320 (2015) 346-360, http://dx.doi.org/10.1016/j.ins.2015.02.004, 0020-0255/2015 Elsevier Inc. All rights reserved. (Year: 2015).*

(Continued)

*Primary Examiner* — Maurice L. McDowell, Jr.
(74) *Attorney, Agent, or Firm* — Harness, Dickey & Pierce, P.L.C.; Anthony G. Fussner (57) ABSTRACT A pose of an eye of a user is determined by providing a parameterized 3D model of the eye, said model including a set of parameters which have been calibrated, acquiring (step S11) at least one tracking image of the eye, identifying (step S12) a plurality of characteristic features in the acquired tracking image, fitting (step S13) said characteristic features with corresponding features of an optical projection of the calibrated 3D model, thereby forming a set of equations, and numerically solving (step S14) the set of equations to determine the pose of the eye.

14 Claims, 5 Drawing Sheets (56) References Cited

U.S. PATENT DOCUMENTS

| | | | |
|---|---|---|---|
| 2013/0243258 A1* | 9/2013 | Hennessey | G06K 9/00604 |
| | | | 382/103 |
| 2014/0211995 A1* | 7/2014 | Model | G06F 3/013 |
| | | | 382/103 |
| 2016/0084949 A1* | 3/2016 | Huang | G02B 7/287 |
| | | | 348/78 |
| 2016/0202756 A1 | 7/2016 | Wu et al. | |
| 2016/0210503 A1* | 7/2016 | Yin | G06K 9/00335 |
| 2016/0270655 A1* | 9/2016 | Caraffi | A61B 3/0025 |
| 2016/0335475 A1* | 11/2016 | Krenzer | G06T 5/002 |
| 2018/0335840 A1* | 11/2018 | Lin | G06K 9/036 |
| 2019/0156100 A1* | 5/2019 | Rougeaux | G06F 3/013 |

OTHER PUBLICATIONS

Beymer, "Eye gaze tracking using an active stereo head", Proceedings of the 2003 IEEE Computer Society Conference on Computer Vision and Pattern Recognition (CVPR'03), 1063-6919/03 $17.00 2003 IEEE (Year: 2003).*

Seung-Jin Baek et al., "Eyeball model-based iris center localization for visible image-based eye-gaze tracking systems", IEEE Transactions on Consumer Electronics, Dec. 6, 2013 (Dec. 6, 2013) pp. 415-421.

International Search Report and Written Opinion for PCT/EP2018/081557 (published as WO2019096992 on May 23, 2019) which is the parent application to the instant application, dated Feb. 22, 2019, 18 pages.

Extended European Search Report for EP application No. 17202115.6 filed Nov. 16, 2017 which is the parent application to the instant application, dated May 4, 2018, 8 pages.

* cited by examiner

DETECTION OF A POSE OF AN EYE

This patent application is a U.S. national stage filing under 35 U.S.C. § 371 of PCT International Application No. PCT/EP2018/081557 filed Nov. 16, 2018 (published as WO2019/096992 on May 23, 2019), which claims priority to and the benefit of European Application No. 17202115.6 filed Nov. 16, 2017. The entire contents of these applications are incorporated herein by reference.

FIELD OF THE INVENTION

The present invention relates to eye pose detection based on a 3D model of the eye.

BACKGROUND OF THE INVENTION

There are various approaches to determine the eye pose or direction of gaze of a person based on images acquired by one or several image sensors. In general, a model of the eye is correlated to the acquired images, thereby determining the direction of gaze.

One approach is to use a 3D model of the eye. Conventionally, such methods will include a calibration phase, where basic parameters of the 3D model, such as cornea size and curvature, are analytically determined by analyzing acquired image data. After such calibration, a direction of gaze can be analytically determined using the model and an image of eye from which the glint together with the pupil or iris can be identified.

The above approach can work well, but the requirement that many calculations are analytical typically result in using an oversimplified model. If a more complex model is used, it becomes very complicated to find an analytical solution.

GENERAL DISCLOSURE OF THE INVENTION

It is an object with the present invention to mitigate the above problems, and to provide more computationally effective eye pose detection using a 3D model of the eye, also allowing a more elaborate model.

According to a first aspect of the present invention, this and other objects are achieved by a method for determining a pose of an eye of a user, the pose including a position and orientation of the eye, including providing a parameterized 3D model of the eye, the model including a set of parameters which have been calibrated, and determining the pose by acquiring at least one tracking image of the eye, identifying a plurality of characteristic features in the acquired image, fitting the characteristic features with corresponding features of an optical projection of the calibrated 3D model on an image plane of the tracking image, thereby forming a set of equations, and numerically solving the set of equations to determine the pose of the eye.

According to embodiments of the present invention, detection of the eye pose is performed numerically, by solving a set of equations generated by comparing an image of the eye with an optical 2D projection of the 3D model in the image plane of the image. The equations may be non-linear. The number of equations in the set is determined by the number of features that can be reliably identified in the image and mapped onto corresponding features in the projected 3D model. The features should be distinct in the image and easily extractable from the projected 3D model. Examples of such features include pupil center point, pupil contour, and a shape and size of an iris contour.

The 3D model may include a cornea and a pupil of the eye, in which case the set of parameters can include a distance between the pupil and a distal point of the cornea, a curvature of the cornea, and a radius of the cornea. Such parameters are advantageous for modelling individual variations of the eye, and may be effectively calibrated using the present invention.

By "pose of an eye" is intended a position in six degrees of freedom (orientation and location). The eye pose may be expressed with respect to a "head space", i.e. in a coordinate system aligned with the head. But typically the final output from an eye tracking system is the eye pose expressed in a reference coordinate system of the room.

By "optical projection" is intended the visual appearance of the 3D model when viewed from the image plane. The outer parts of the eye (e.g. the edges of the cornea) will simply be projected onto the plane, while internal parts (e.g. the pupil) will be refracted through the cornea surface. In addition to any geometrical parameters, the 3D model will thus include optical parameter(s) to model the refraction between cornea and surrounding medium (e.g. air). In reality, the refraction will be caused by a series of interfaces between mediums with different index of refraction. However, the refraction is typically modelled by one single interface and one single refractive index. This "aggregate" refractive index can be determined experimentally, and is relatively close to the refractive index of a saline solution.

Further suitable parameters include a space angle between an optical axis of the eye and a visual axis of the eye, expressed as two angles in Cartesian space, or two angles in a cylindrical space with the optical axis as the Z-axis. As the skilled person will appreciate, the optical axis is an axis through the center of the eye and the center of the pupil, while the visual axis is an axis through the macula and a nodal point of the pupil. For practical reasons, the nodal points is typically approximated by the center of the pupil or the center of a sphere aligned with the cornea.

According to one embodiment, at least two tracking images are acquired using two image sensors spatially separated from each other. In this case, the steps of identifying characterizing features and fitting the characteristic features with a projection of the 3D model will be performed for two or more images, thereby forming a larger (e.g. twice as large) set of equations.

In some embodiments, the tracking system includes a light source for illumination of the target area. The tracking image will then include a refection in the cornea, a so called "glint". The set of equations may then further include equation based on the glint position in the tracking image, a known geometrical relationship between an image sensor and a light source, and a modeled cornea normal direction in the glint position. In a system with several image sensors and/or several light sources, several glints may be present.

The method according to the invention requires calibration of a set of parameters of the 3D model. According to one embodiment, such calibration is performed by acquiring, for a set of known gaze directions, at least one calibration image of the eye, for each calibration image, identifying a plurality of characteristic features, and fitting said characteristic features with corresponding features of a projection of the 3D model on an image plane of the calibration image, thereby forming a set of equations for each known gaze direction, and numerically solving the sets of equations to determine the set of parameters of the 3D model.

For a simple model, with only few parameters, it may be sufficient with only one known gaze direction. However, in a typical application more than one known gaze direction will be required, such as four or six known gaze directions. Generally speaking, all other things being equal, a calibration will become more exact if more known gaze direction are available.

Such calibration, involving image acquisition for known gaze directions, is reliable and robust, but typically needs to be performed off-line, or at least during a designated calibration sequence. Other methods may be contemplated, such as statistical calibration or on-line calibration. On-line calibration refers to calibration that may be performed while a head or eye tracking system is running, and can e.g. be achieved by evaluating the residual errors between model and projections from multiple views during tracking and minimizing such errors by modifying the model parameters. Typically, the parameters are constrained to values based on a normal population.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Embodiments of the present invention will now be discussed with reference to an eye tracking system. However, the principles of the invention are equally useful to any application where the pose of an eye is determined.

Figure 1:
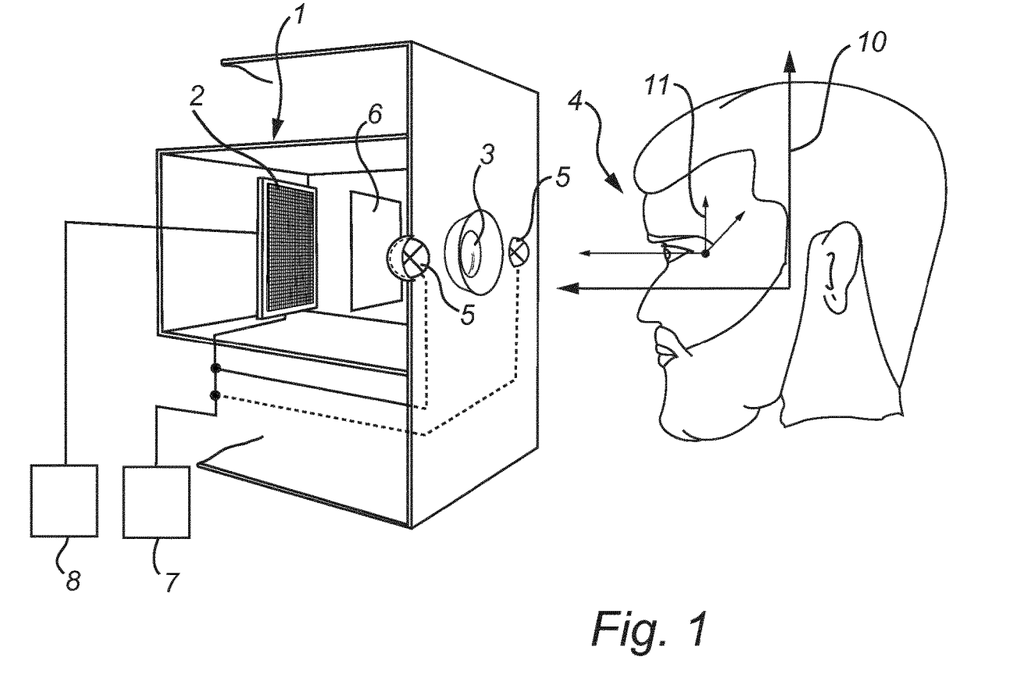
FIG. 1 shows a schematic view of an eye tracking system in which the present invention may be applied.

The eye tracking system in FIG. 1 includes an image acquisition device, or camera 1, including an image sensor 2, e.g. a CMOS image sensor, and suitable optics 3. The camera 1 is arranged to acquire images of a user 4, more specifically the head and eyes of the user.

As indicated on FIG. 1, the coordinate system of the user's head is indicated by 10, while the coordinate system of the eye is indicated by 11.

The system further comprises processing circuitry 8 (also referred to as a processor) connected to receive images acquired by the sensor 2. The processor 8 is further programmed to determine and track the pose of the eyes to determine the direction of gaze of the user, i.e. where the user is looking. The system in FIG. 1 has many different applications, including automotive applications where the eyes of a driver are tracked e.g. for safety reasons, as well as various man-machine interfaces.

The direction of gaze is determined based on acquired images without illumination, by determining a head pose (location and orientation of coordinate system 10 in space) and then an eye pose (location and orientation of the coordinate system 11 in relation to the coordinate system 10). In a simple case, sometimes referred to as estimated eye tracking, the eye pose is determined based on the position of the iris with respect to the head. However, in many applications, a more precise eye gaze detection is required, and for this purpose the system may be equipped with one or several sources of illumination 5 with a known geometric relationship to the sensor 2. With illumination of a light source, the acquired images will include a reflection (glint) in the cornea of the eye, which can be used to make the eye gaze determination more exact. In the following, such a "precise" eye tracking system is disclosed, but it is noted that the present invention is also advantageous in an "estimated" eye tracking system without illumination.

The illustrated examples includes two light sources 5, thereby enabling acquisition of images with different illumination, and thus differently located glints.

The light source(s) is/are typically configured to emit light outside the visible range such as infra-red (IR) or near infra-red (NIR). The light source may be a solid state light source, such as a LED. In the illustrated example, the light sources 5 are LEDs configured to emit light with a light spectrum concentrated in a 50 nm band centered around 850 or 940 nm (NIR). Further, an optical band-pass filter 6, e.g. an interference filter, is arranged between the user and the camera 1. The filter 6 is configured to have a pass-band substantially corresponding to the light emission spectrum of the light sources 5. So, in the above mentioned example, the filter 6 should have a pass-band centered around 850 nm or 940 nm, e.g. 825-875 nm or 915-965 nm.

A controller 7 is connected to the camera 1 and LEDs 5, and programmed to control the sensor 2 to acquire consecutive images under illumination by the LEDs 5. Typically, the LEDs 5 are driven with a given duty cycle, and the controller 7 then controls the sensor 1 to acquire images in synchronization with the light pulses from the LEDs 5.

During operation, the user 4 is illuminated by the light source, and light reflected from the object (face of the user) passes the filter 6 and is received by the camera optics 3 and stored in the sensor 2. It is noted that most ambient light will be blocked by the filter, thereby reducing the required power of the light source.

Figures 3A, 3B:
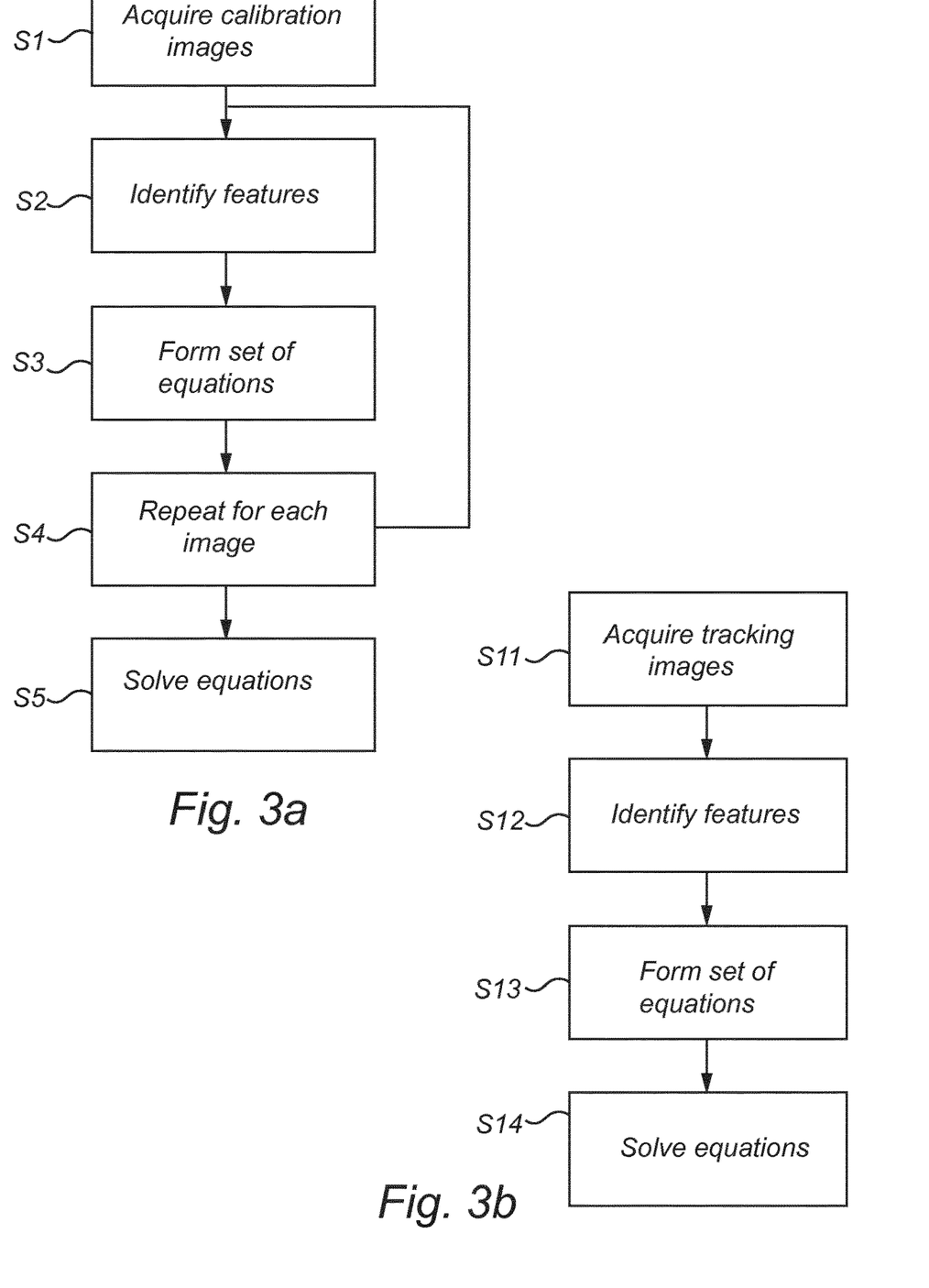
FIGS. 3a and 3b are flowcharts of methods according to embodiments of the present invention.

In accordance with an embodiment of the present invention, the processor 8 is programmed to perform the method outlined in the flow chart in FIGS. 3a and 3b. The procedure is based on a parameterized 3D model of the human eye, stored in a memory 9 accessible to the processor 8.

Figure 2:
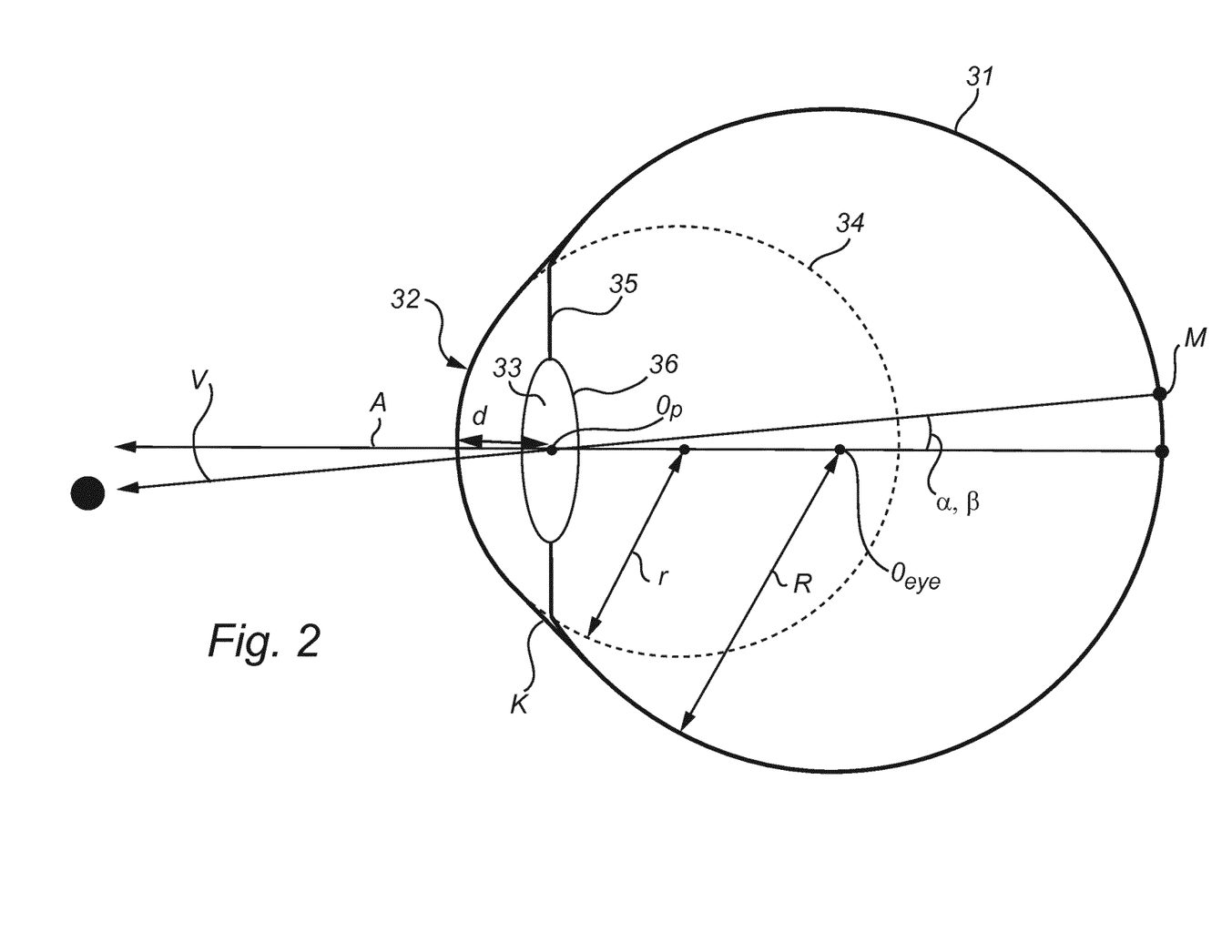
FIG. 2 shows a schematic model of a human eye.

An example of a 3D model of the human eye is shown schematically in FIG. 2. Here, the model includes an eyeball 31, cornea 32 (i.e. the dome covering the iris) and a pupil 33 (i.e. the opening allowing light to enter the eye). Suitable parameters to be calibrated may include:

a radius R of the eyeball 31,
a radius r of an imagined sphere 34 aligned with the cornea 32,
a curvature κ of the cornea, i.e. a deviation from the imagined sphere 34,
a distance d between the pupil 33 and a distal point (distal pole) of the cornea surface,
a space angle between an optical axis A and a visual axis V, where the optical axis A is an axis through the center $O_{eye}$ of the eyeball and the center $O_p$ of the pupil, and the visual axis V is an axis through the center P of the pupil 33 and the yellow spot or macula M. The space angle is here expressed as two angles α, β in Cartesian space.

It is noted that this list of parameters is not exhaustive, and may be extended in a more complex model. For example, in the illustrated example, the pupil 33 is assumed to be a disc-shaped opening in a plane 35 normal to the optical axis, and the distance d is taken from the outer point of the cornea to this plane 35. In reality, the pupil 33 is defined by the lens 36, which has an elliptical extension in the plane of the figure. To be even more realistic, the lens 36 is located behind the plane 35, where it is held in place and shaped by muscles (not shown). Further, the center $O_p$ of the pupil 33 is here assumed to always lie on the center axis of the cornea, while in reality the center of the pupil may be slightly off-center and also depend on the size of the pupil (a small pupil is typically more off-center than a large pupil). A more complex model will require more parameters to calibrate, but may potentially improve performance.

Conversely, the model may also be made more simple than in the illustrated case, For example, the radius R of the eyeball can be assumed to be the same for all persons, eliminating the need to calibrate the radius R. Further, the cornea 32 may be assumed to be spherical, eliminating the need to calibrate the curvature κ.

In addition to geometrical parameters, such as those mentioned above, the model also includes parameters related to the optical properties. For example, the refractive index of the cornea which may be determined experimentally.

Figure 4A:
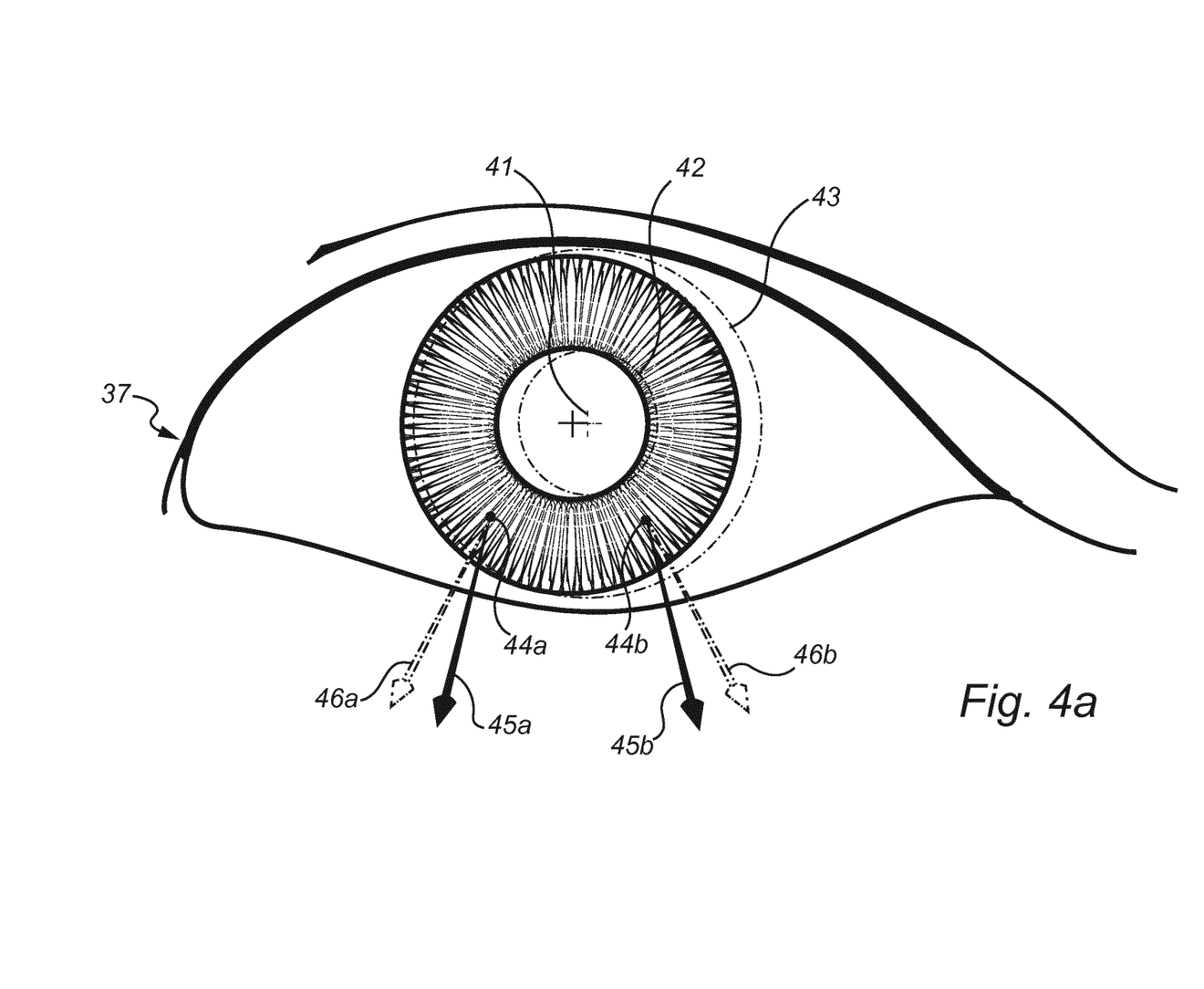
FIGS. 4a and 4b show schematic illustrations of an image of an eye and selected features from the 3D model superposed thereon.
Figure 4B:
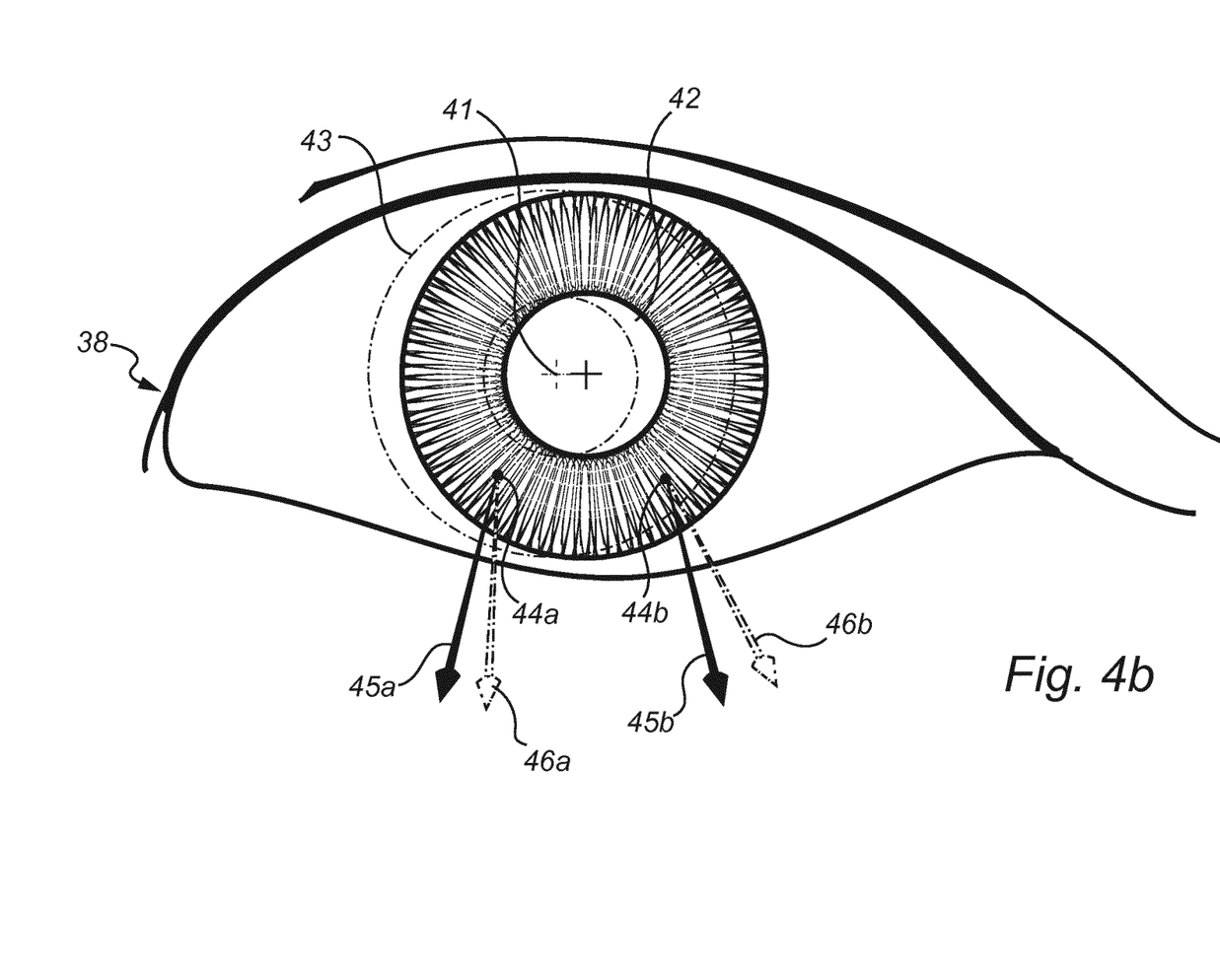

The operation of the system will now be discussed with reference to FIGS. 3a, 3b and 4a, 4b. FIGS. 3a and 4a show an example of a calibration procedure for determining the parameters of the 3D model. FIGS. 3b and 4b show the actual detection of an eye pose (in six degrees of freedom). The steps involving calculations may be performed by the processing circuitry 8.

Calibration

Even without calibration, an approximate gaze direction of a user may be determined using conventional techniques. However, in order to obtain a more exact determination of the pose of an eye, calibration of the unknown parameters of the 3D model will be required. The procedure outlined below is one example of a calibration process, but other options are possible. For example, the calibration may be based on statistical data instead of a series of images with known gaze directions, sometimes referred to as "statistical calibration". The calibration may also be performed on-line, i.e. while the eye-tracking is running.

The illustrated calibration process starts in step S1 by acquiring a set of calibration images 37 using the camera 1, where each calibration image is associated with a known and unique direction of gaze. The calibration images may for example be acquired while the user is looking at a specific object on displayed on a screen. The acquisition process may involve some form of confirmation from the user when he/she is looking at the object, or may be semi-automatic in the sense that the system is configured to recognize when a user looks steadily at an object.

For each known gaze direction, a series of separate calibration images may be acquired. Typically, a handful of calibration images, e.g. 3-5 calibration images are acquired from each known gaze direction. In order to acquire the calibration images, it may be advantageous to acquire a much larger number of images, e.g. as many as 50 images, cluster these images, and then select 3-5 representative calibration images from the cluster.

In step S2, characteristic features in each calibration image 37 are identified, and in step S3, the identified features are fitted with corresponding features in an optical 2D projection of the 3D model in the image plane of the calibration image, thereby defining a set of equations.

FIG. 4a illustrates examples of features that may be useful to use in order to determine equations. The features resulting from the optical projection here include the center of the pupil 41, the outline or contour 42 of the pupil, and the outline or contour 43 of the iris. It can be seen that the center of the pupil 42 is slightly offset compared to the image, the size of the pupil is too large, and the size and shape of the iris does not match the image. This indicates that the parameters of the model are not calibrated.

In FIG. 4a, the modeled features, i.e. the features 41, 42, 43 resulting from an optical projection of the model, are illustrated as deviating slightly from the image, which corresponds to an optical projection of an uncalibrated model. In reality, of course, the optical projection is a mathematical model including the set of unknown parameters which are to be calibrated, and each feature 41, 42, 43 is a mathematical expression based on a known eye pose (known direction of gaze) but including one or several of the unknown parameters. Each such expression is then set equal to the corresponding feature identified in the image (using suitable image processing), which results in one (or more) equation in the set. The different parameters can and will interact, so several equations will need to be determined and solved numerically in order to determine all parameters.

To further improve the calibration, one or several glints, here two glints 44a, 44b, may be identified in the calibration image. It is noted that the number of glints will depend on the number of sensors and/or number of light sources. It is further noted that for each glint, a normal direction 45a, 45b in the glint position can be determined based on knowledge of the geometrical relative positions of the sensor 2 and light source(s) 5. In the model, the parameters r (cornea radius) and κ (cornea curvature) will define a mathematical expression of a modeled normal direction 46a, 46b in each glint position. Again, by setting this expression equal to the actual normal direction, an equation is determined which may be included in the set of equations.

Step S4 serves to repeat steps S2 and S3 for each calibration image in the series, and for each known gaze direction.

Then, in step S5, the entire set of equations, including a plurality of equations for each calibration image acquired from each known gaze direction, is solved numerically to determine the parameters of the 3D model.

The number of known gaze directions, and the number of calibration images acquired for each direction, needs to be sufficient to enable determination of the set of parameters, and thus will depend on the number of parameters and also the number of features identified in each calibration image. As an example, three to five calibration images are acquired for three to six known gaze directions should be sufficient. As discussed above, each calibration image results in a plurality of equations, so that the total number of equations in the set may be in the order of hundreds.

It is noted that in the illustrated example the number of known gaze directions in step S1 is pre-set. Another alternative is an adaptive calibration sequence, where steps S2, S3 and S5 are repeated for all images acquired from one known gaze direction, before acquiring a series of images for the next gaze direction. In that case, step S5 will be followed by some type of assessment of the quality of the currently available calibration, and a decision whether or not to acquire images from yet another gaze direction.

Eye Pose Detection

The illustrated eye pose detection starts in step S11 by acquiring a tracking image 38 of the eye using the camera 1. In step S12, a set of characterizing features is identified, and in step S13 the identified features are fitted with corresponding features in a 2D projection of the 3D model in the image plane of the calibration image, thereby defining a set of equations.

Steps S12 and S13 essentially correspond to steps S2 and S3 in FIG. 3a, with the important difference that the parameters of the model are now known, while the eye pose is unknown. The eye pose is defined in six degrees of freedom, and includes the position of the eye in space as well as the orientation of the eye. In step S14, the set of equations are solved, thereby determining the pose of the eye.

FIG. 4b is similar to FIG. 4a, but here illustrates a projection of a calibrated model on a tracking image 38 of the eye. Just as in FIG. 4a, the features resulting from the optical projection include the center 41 of the pupil, the outline or contour 42 of the pupil, and the outline or contour 43 of the iris.

In FIG. 4b, the shape and size of the iris and pupil correspond to the tracking image, but are slightly offset. This corresponds to an error in the eye pose, i.e. it is an optical projection of a model in the wrong position. In reality, of course, the optical projection is a mathematical model based on the 3D model in an unknown position (eye pose), and each feature 41, 42, 43 is a mathematical expression based on the calibrated model and including the six unknown degrees of freedom of the eye pose. Each such expression is then set equal to the corresponding feature identified in the image (using suitable image processing), resulting in one (or more) equation in the set.

To further improve the tracking, one or several glints, here two glints 44a, 44b, may be identified in the tracking image, just as was discussed with reference to the calibration image. In FIG. 4b, the actual normal direction in each glint position 45a, 45b (based on a known geometrical relationship between sensor(s) and light source(s)) deviates slightly from a modeled normal direction 46a, 46b, due to the incorrect position (eye pose). Similar to the calibration process, a mathematical expression of a modeled normal direction in each glint position is set equal to the actual normal direction, thereby forming an equation which can be included in the set of equations.

In the illustrated example, the system in FIG. 1 has only one camera, and may only acquire one image at a given instance. The images may be acquired with alternating illumination from the two light sources 5, thereby adding information.

In another embodiment, the system includes two (or more) cameras, thereby enabling to acquisition of simultaneous images from slightly different angels. In such a system, step S11 will include acquiring two images of the eye, and the set of equations in steps S12-S14 will include equations determined from both images (i.e. twice as many equations). Such processing will increase accuracy and robustness of the eye pose detection.

The processing FIG. 3b may be performed for one eye at a time, or for both eyes simultaneously. Further, the process may be repeated continuously, in order to monitor and track the eyes. By tracking the eye pose of both eyes it can be determined with high accuracy where the user is looking.

The person skilled in the art realizes that the present invention by no means is limited to the preferred embodiments described above. On the contrary, many modifications and variations are possible within the scope of the appended claims. For example, the system may include more than one camera, and also more than one light source. Further, the set of parameters may include additional parameters than those discussed above, depending on the exact definition of the 3D model.

The invention claimed is:

1. A method for determining a pose of an eye of a user, said pose including a position and orientation of the eye, the method comprising:
providing a parameterized 3D model of the eye, said model including a set of parameters which have been calibrated;
determining said pose by:
acquiring at least one tracking image of the eye,
identifying a plurality of characteristic features in the acquired tracking image,
fitting said characteristic features with corresponding features of an optical projection of the calibrated 3D model on an image plane of the tracking image, thereby forming a set of equations, and
numerically solving the set of equations to determine the pose of the eye;
wherein the tracking image is acquired with an image sensor under illumination from a light source, so that the tracking image includes at least one glint in a glint position, and
wherein the set of equations includes at least one equation determined by a relationship between an actual normal direction in said glint position, said actual normal direction being based on a known geometrical relationship between the image sensor and the light source, and a modeled normal direction in said glint position based on said 3D model.

2. The method according to claim 1, wherein the set of equations is non-linear.

3. The method according to claim 1, wherein the 3D model includes a cornea and a pupil.

4. The method according to claim 1, wherein the plurality of characterizing features include at least one of a pupil center point and a pupil contour.

5. The method according to claim 1, wherein the plurality of characterizing features include at least one of a shape and size of an iris contour.

6. The method according to claim 1, wherein tracking images are acquired with alternating illumination from at least two light sources.

7. A method for determining a pose of an eye of a user, said pose including a position and orientation of the eye, the method comprising:
providing a parameterized 3D model of the eye, said model including a set of parameters which have been calibrated;
determining said pose by:
acquiring at least one tracking image of the eye,
identifying a plurality of characteristic features in the acquired tracking image,
fitting said characteristic features with corresponding features of an optical projection of the calibrated 3D model on an image plane of the tracking image, thereby forming a set of equations, and
numerically solving the set of equations to determine the pose of the eye;
wherein the method further comprises calibrating the 3D model by:
for a set of known gaze directions, acquiring at least one calibration image of the eye,
for each calibration image, identifying a plurality of characteristic features, and fitting said characteristic features with corresponding features of an optical projection of the 3D model on an image plane of the calibration image, thereby forming a set of equations for each known gaze direction, and
numerically solving the sets of equations to determine the set of parameters of the 3D model.

8. The method according to claim 7, wherein the tracking image is acquired with an image sensor under illumination from a light source, so that the tracking image includes at least one glint in a glint position, and wherein the set of equations includes at least one equation determined by a relationship between an actual normal direction in said glint position, said actual normal direction being based on a known geometrical relationship between the image sensor and the light source, and a modeled normal direction in said glint position based on said 3D model.

9. The method according to claim 7, wherein the set of parameters include a distance between the pupil and a distal pole of the cornea, a curvature of the cornea, and a radius of the cornea.

10. The method according to claim 7, wherein the set of parameters include a space angle between an optical axis of the eye and a visual axis of the eye.

11. The method according to claim 7, wherein the set of known gaze directions includes more than one gaze direction, preferably at least three gaze directions.

12. The method according to claim 7, wherein more than one calibration image is acquired for each known gaze direction.

13. A system for determining a pose of an eye, the system comprising:
    at least one image sensor,
    a controller for controlling the image sensor to acquire a tracking image of an eye,
    processing circuitry configured to:
        access a parameterized 3D model of the eye, said model including a set of parameters which have been calibrated
        identify a plurality of characteristic features in the acquired tracking image,
        fit said characteristic features with corresponding features of an optical projection of the calibrated 3D model on an image plane of the tracking image, thereby forming a set of equations, and
        numerically solve the set of equations to determine the pose of the eye;
wherein the system comprises at least one light source for illuminating the eye during acquisition of a tracking image, said processing circuitry is further configured to identify at least one glint in the tracking image, and the set of equations includes at least one equation determined by a relationship between an actual normal direction in said glint position, said actual normal direction being based on a known geometrical relationship between the image sensor and the light source, and a modeled normal direction in said glint position based on said 3D model; and/or
wherein said processing circuitry is further configured to calibrate the 3D model by:
    for a set of known gaze directions, acquiring at least one calibration image of the eye,
    for each calibration image, identifying a plurality of characteristic features, and fitting said characteristic features with corresponding features of an optical projection of the 3D model on an image plane of the calibration image, thereby forming a set of equations for each known gaze direction, and
    numerically solving the sets of equations to determine the set of parameters of the 3D model.

14. The system according to claim 13, comprising at least two light sources, wherein said controller is configured to acquire tracking images with alternating illumination from said at least two light sources.

* * * * *